W. H. McCORMICK.
Devices for Closing Gates and Doors.

No. 151,145. Patented May 19, 1874.

WITNESSES:

INVENTOR
Wm. H. McCormick
per T. H. Alexander
ATTORNEY.

UNITED STATES PATENT OFFICE.

WILLIAM H. McCORMICK, OF MUNCIE, INDIANA, ASSIGNOR TO HIMSELF AND SAMUEL BEAR.

IMPROVEMENT IN DEVICES FOR CLOSING GATES AND DOORS.

Specification forming part of Letters Patent No. 151,145, dated May 19, 1874; application filed April 17, 1874.

*To all whom it may concern:*

Be it known that I, W. H. McCORMICK, of Muncie, in the county of Delaware and State of Indiana, have invented certain new and useful Improvements in Means of Closing Gates, Doors, &c.; and I do hereby declare that the following is a full, clear, and exact description thereof, reference being had to the accompanying drawings and to the letters of reference marked thereon, which form part of this specification.

The nature of my invention consists in the employment of a weight, in combination with a cranked bar, so arranged in relation to a gate or door that it may be automatically closed by the gravitation of the weight, as will be hereinafter more fully described and shown.

In order to enable others skilled in the art to which my invention appertains to make and use the same I will now proceed to describe its construction and operation, referring to the annexed drawing, in which—

Figure 1:
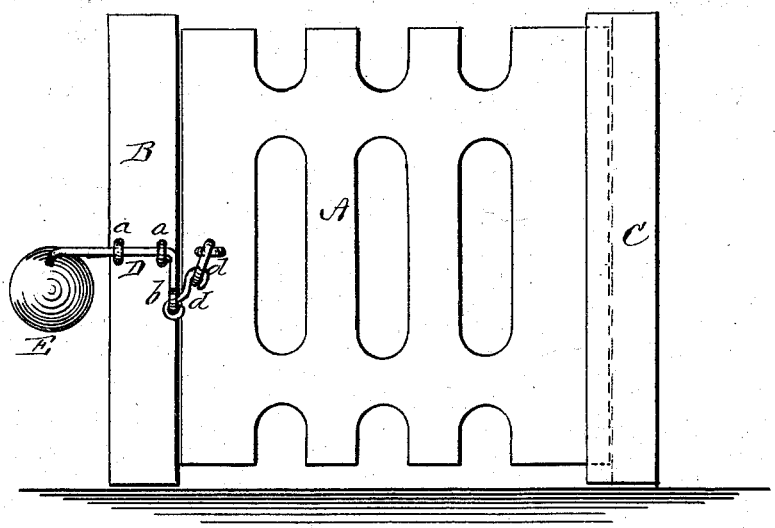
Figure 2:
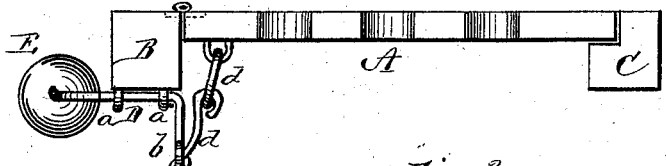
Figure 3:
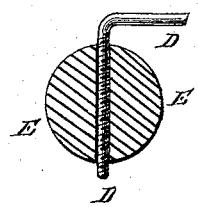

Figure 1 is a front view of a gate embodying my invention. Fig. 2 is a plan view of the same; and Fig. 3 is a detached view, showing how the weight may be adjusted on the rod.

A represents a gate hinged to a gate-post, B, in any desired manner, and closing against another post, C. On the front side of the post B, in suitable staples or bearings $a\,a$, is placed a horizontal shaft or rod, D, the inner end of which is bent at right angles, forming a crank, $b$, and this is, by links $d\,d$, connected with the gate. The outer end of the rod D is also bent at an angle, and on the same is placed a ball or weight, E, which is adjustable thereon and fastened by means of a wedge, set-screw, or other suitable means.

In the drawings I have shown one means of adjustment, but of course do not confine myself to any specific way. By opening the gate the rod D is turned in its bearings, so as to raise the weight; and hence when the gate is let go the weight will fall and turn the rod D back to its former position, thereby closing the gate again. By adjusting the weight out or in on the rod more or less power is obtained, as desired. This device may be arranged so as to close the gate at whatever point to which it may be opened, except when thrown entirely back, when the weight will be raised perpendicularly and thus hold the gate open.

Having thus fully described my invention, what I claim as new, and desire to secure by Letters Patent, is—

The rod D, with crank $b$ at one end and adjustable weight E on the other bent end, in combination with a gate, A, gate-post B, and links $d$, connecting the crank with the gate, substantially as and for the purposes herein set forth.

In testimony that I claim the foregoing as my own I affix my signature in presence of two witnesses.

WILLIAM H. McCORMICK.

Witnesses:
  GEO. W. SPILKER,
  C. E. SHIPLEY.